United States Patent [19]

Munakata et al.

[11] Patent Number: 4,618,561
[45] Date of Patent: Oct. 21, 1986

[54] MONOMOLECULAR RECORD MEMORY MEDIUM WITH PHOTOSENSITIVE DIAZONIUM SALT

[75] Inventors: Hirohide Munakata; Yoshinori Tomida, both of Yokohama; Masahiro Haruta, Funabashi; Yutaka Hirai, Tokyo; Yukuo Nishimura, Sagamihara; Takashi Hamamoto, Yokohama, all of Japan

[73] Assignee: Canon Kabushiki Kaisha, Tokyo, Japan

[21] Appl. No.: 676,254

[22] Filed: Nov. 29, 1984

[30] Foreign Application Priority Data

Dec. 6, 1983 [JP] Japan .................. 58-229118

[51] Int. Cl.$^4$ .................. G03C 1/54; G03C 1/58; G03G 5/04; G01D 15/14
[52] U.S. Cl. .................. 430/156; 430/54; 430/60; 430/66; 430/69; 430/141; 430/157; 430/163; 430/171; 430/175; 430/183; 430/945
[58] Field of Search .............. 430/141, 163, 171, 183, 430/945, 175, 156, 54, 60, 66, 69, 49, 157; 346/135.1

[56] References Cited

U.S. PATENT DOCUMENTS

| | | | |
|---|---|---|---|
| 2,336,309 | 12/1943 | Snell et al. | 430/183 |
| 3,997,349 | 12/1976 | Sanders | 430/163 |
| 4,248,959 | 2/1981 | Jeffers et al. | 430/141 |
| 4,309,453 | 1/1982 | Reiner et al. | 427/54.1 |
| 4,309,482 | 1/1982 | Suzuki et al. | 427/54.1 |
| 4,435,491 | 3/1984 | Kitamura et al. | 430/156 |
| 4,469,767 | 9/1984 | Kitamura et al. | 430/54 |
| 4,499,170 | 2/1985 | Amariti et al. | 430/175 |
| 4,518,668 | 5/1985 | Nakayama | 430/54 |
| 4,521,503 | 6/1985 | Herbert | 430/49 |
| 4,529,681 | 7/1985 | Usami et al. | 430/151 |
| 4,539,061 | 9/1985 | Sagiv | 428/420 |

FOREIGN PATENT DOCUMENTS 2620283  11/1976  Fed. Rep. of Germany ...... 430/146

OTHER PUBLICATIONS

Howe, D. G., et al., *Photo Sci & Eng*, vol. 23, No. 6, 11–12/1979, pp. 370–374.
Bartolini, R. A., et al., *Optical Engineering*, vol. 15, No. 2, 3–4/1976, pp. 99–108.

*Primary Examiner*—Charles L. Bowers, Jr.
*Attorney, Agent, or Firm*—Fitzpatrick, Cella, Harper & Scinto

[57] ABSTRACT

A record memory medium comprises a recording layer comprising a monomolecular film or monomolecular layer built-up film of a photosensitive organic compound having a hydrophilic moiety and a hydrophobic moiety. The medium can be used for recording/reading-out of information and light recording.

14 Claims, No Drawings

MONOMOLECULAR RECORD MEMORY MEDIUM WITH PHOTOSENSITIVE DIAZONIUM SALT

BACKGROUND OF THE INVENTION

1. Field of the Invention

This invention relates to a record memory medium having a recording layer comprising a photosensitive organic compound and recording/reading method comprising recording information by irradiating a photosensitive organic compound with light and reading out the information by light.

2. Description of the Prior Art

Heretofore, there have been known various record memory mediums for recording and reading out such as light disc, photomagnetic disc and the like. As the record receiving mediums, there are known rare earths-transition metal alloy thin films, reducing oxide thin films of chalcogen compounds utilizing phase transfer from amorphous state to crystalline state, heat mode recording mediums, thermoplastic recording mediums and the like. These mediums are formed on a substrate by coating, sputtering, vapor deposition or the like. It is required to make the film thickness of the recording layer as thin as possible so as to produce high density records. However, heretofore, the limit is about 300 Å which is twice to twenty times as thick as the thickness of the film forming molecule. Heretofore, the distribution and orientation of molecules in the film are irregular so that the boundary between the light irradiated portion and the non-light irradiated portion is unclear upon writing-in with light. This causes a reduction in the S/N ratio due to blur of light slot when light is projected for reading out. Therefore, from the standpoint of sensitivity, it is desired that distribution and orientation of molecules in the film are uniform.

SUMMARY OF THE INVENTION

An object of the present invention is to provide a record memory medium for high density and high sensitivity recording.

Another object of the present invention is to provide a recording/reading method capable of producing high sensitivity and high density record.

According to one aspect of the present invention, there is provided a record memory medium which comprises a recording layer comprising a monomolecular film or monomolecular layer built-up film of a photosensitive organic compound having a hydrophilic moiety and a hydrophobic moiety.

According to another aspect of a recording/reading-out method there comprises recording information in a recording layer comprising a monomolecular film or monomolecular layer built-up film of a photosensitive organic compound having a hydrophilic moiety and a hydrophobic moiety by light irradiation and reading-out the recorded information by light.

According to a further aspect of a light recording method there comprises forming a record in a recording layer comprising a monomolecular film or monomolecular layer built-up film of a photosensitive organic compound having a hydrophilic moiety and a hydrophobic moiety by light irradiation.

DETAILED DESCRIPTION OF THE PREFERRED EMBODIMENTS

As the photosensitive organic compounds used for producing the record memory medium according to the present invention, there may be used various photosensitive organic compounds having a hydrophilic moiety and a hydrophobic moiety in the molecule. Diazonium compounds are particularly preferable. More preferably the compounds having the following characteristics are selected.

(1) High sensitivity,
(2) Rapid coupling speed at a particular pH region,
(3) Formation of stable azo compounds of high density,
(4) High thermal stability,
(5) Formation of colorless photolysis products which are stable against light and air and do not change color with the lapse of time,
(6) Easily soluble in an appropriate organic solvent.

Representative photosensitive organic compounds used for producing the record memory medium of the present invention are benzene diazonium salts having a long chain $C_8$–$C_{30}$ alkyl as the side chain which may be substituted, for example, by amino group, carboxyl group or the like, or may have an unsaturated bond.

Typical examples of the compounds are:
4-Octyl benzene diazonium chloride,
4-hexadecyl benzene diazonium chloride,
4-eicosyl-4-N-benzyl-N-methyl-amine-5-p-chlorophenoxybenzene diazonium chloride,
2-ethoxy-5-decyloxy-4-p-tolyl-mercaptobenzene diazonium salt,
p-decylbenzene diazonium salt,
p-(1-n-octadecyl-morpholino)-2,5-di-n-butoxybenzene diazonium salt, and
p-(18-nonadecenyl)-benzene diazonium salt.

The recording memory medium of the present invention may be produced by forming a monomolecular film or monomolecular layer built-up film of a photosensitive organic compound as mentioned above by, for example the, Langmuir-Blodgett method.

According to Langmuir-Blodgett method, a monomolecular film or a monomolecular layer built-up film is prepared by utilizing the phenomenon in a molecule having a hydrophilic group and a hydrophobic group that the molecule is formed into a layer on the water surface with the hydrophilic group pending downward when a moderate balance between both groups is maintained.

The monomolecular layer on the water surface has the specific feature of a two dimensional system. When the moledules are scattered sparsely, the following equation of two dimensional ideal gas is valid between the surface area A per one molecule and the surface pressure $\pi$, thus forming "gas film":

$$\pi A = kT$$

wherein k is the Boltzman constant and T is absolute temperature.

If A is made sufficiently small, the interactions between molecules are strengthened to form "condensed (or solid) film" of two dimensional solid. The condensed film can be transferred in a layer one by one onto the surface of a substrate such as glass. By use of this method, the monomolecular film or the monomolecular layer built-up film can be produced according to, for example, the procedure as described below.

First, a photosensitive organic compound is dissolved in a solvent, and the resultant solution is developed on a water surface to form a film of the photosensitive organic compound. Next, the deposited state of the film substance is controlled through restriction of its development area by providing a partition wall (or a buoy) so that the film substance may not be expanded too much by free diffusion on the water surface, to obtain a surface pressure $\pi$ in proportion to the deposited state. By moving this partition wall, the development area can be reduced to control the deposited state of the film substance, whereby the surface pressure can be increased gradually to set a surface pressure $\pi$ suitable for production of the built-up film. While maintaining this surface pressure, a clean substrate can be moved vertically therethrough to have the monomolecular film transferred thereon. A monomolecular film can be produced as described above, and a built-up film of monomolecular layers can be formed by repeating the above procedure to a desired degree of build-up.

For transfer of the monomolecular film onto a substrate, in addition to the vertical dipping method as mentioned above, it is also possible to employ a method such as the horizontal attachment method, the rotary cylinder method, etc. According to the horizontal method, the substrate is brought into contact with the water surface horizontally for transfer of the monomolecular layer, while the monomolecular layer is transferred according to the rotary cylinder method by rotating a cylindrically shaped substrate on the water surface. According to the vertical dipping method as mentioned above, when a substrate is drawn up across the water surface, a monomolecular layer with the hydrophilic groups facing toward the substrate side is formed for the first layer on the substrate. When the substrate is moved up and down as described above, monomelecular layers are built-up one by one with the progress of the respective steps. Since the orientation of the film forming molecules in the withdrawing step is opposite to that in the dipping step, a Y-type film, in which hydrophilic groups come face to face with hydrophilic groups or hydrophobic groups with hydrophobic groups between layers, is formed according to this method.

In contrast, according to the horizontal attachment method, transfer is effected by bringing the substrate into contact with the water surface horinzontally, whereby the monomolecular layer is formed with the hydrophobic groups faced toward the substrate side. According to this method, even when built-up, there is no alteration in orientation of the film forming molecules, and a X-type film with the hydrophobic groups faced toward the substrate side are formed in all the layers. On the contrary, built-up film with the hydrophilic groups faced toward the substrate side in all the layers is called the Z-type film.

According to the rotary cylinder method, the monomolecular layers are transferred by rotating a cylindrical substrate on the water surface. The method for transferring the monomolecular layers onto the substrate surface is not limited to these methods, and it is also possible to apply a method in which a substrate is extruded into the aqueous phase from a substrate roll, when employing a substrate with a large area. Also, the orientation of the hydrophilic groups or the hydrophobic groups toward the substrate as described above is no more than the general principle, and it can be changed by a surface treatment of the substrate or other modifications.

The monomolecular film or the monomolecular layer built-up film as a recording layer of the record memory medium is preferably 4–10000 Å, more preferably 15–100 Å.

A substrate used in the present invention is not limited, but if surfactants or the like are attached to the surface of the substrate, the monomolecular film is disturbed upon transferring a monomolecular layer from the water surface, and therefore, good monomolecular film or monomolecular layer built-up film can be obtained. As a result it is necessary to use a clean surface of a substrate. As the substrate, there may be used glass, metal such as aluminum and the like, plastics, ceramics, silicon, Teflon and the like.

The monomolecular film or the monomolecular layer built-up film on the substrate is fixed sufficiently firmly, and it will scarcely be peeled or peeled off from the substrate, but it is also possible to provide an adhesive layer between the substrate and the monomolecular film or the monomolecular layer built-up film for the purpose of reinforcement. Further, the adhesive force can also be strengthened by choice of the monomolecular layer forming conditions, for example, the hydrogen ion concentration, the ion species in the aqueous phase, the surface pressure, and the like.

It is preferable for improving the chemical stability of a monomolecular film or monomolecular layer built-up film to provide a protective film on the monomolecular film or monomolecular layer built-up film, but the protective film may be or may not be provided depending on the property of the film forming molecule.

The recording/reading-out method using the record memory medium produced as above will be described below.

For simplicity, the description is made referring to 4-eicosyl benzene diazonium chloride (I), an aromatic diazonium salt, used as a photosensitive organic compound.

Recording information is effected by utilizing the two chemical reactions, that is, a photolysis reaction (1) and a coupling reaction (2).

First, light (e.g. visible light and ultraviolet ray) irradiation is effected in accordance with a pattern of recording information and the following photolysis reaction of compound I occurs at the irradiated portion.

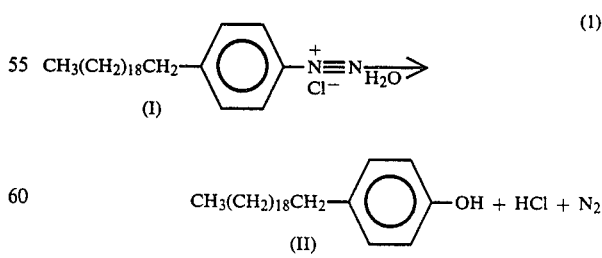

Then the compound I remaining at the non-irradiated portion is subjected to a coupling reaction with an appropriate coupling agent (developer) to give an azo compound. When sodium 2,3-dihydroxynaphthalene-6-sulfonate is used the azo compound III is produced.

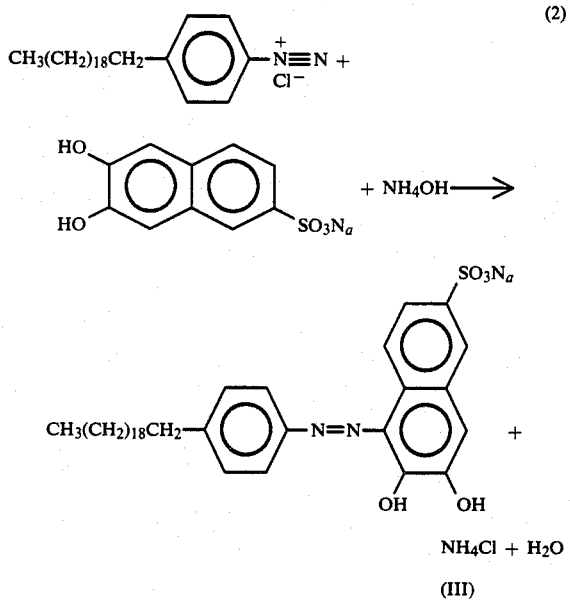

Reading-out of record is effected by detecting the difference between the products (II and III) at the light irradiated portion and the non-light irradiated portion by measuring the difference of absorption spectra upon irradiating with visible light ultraviolet ray, laser light or the like. Azo compounds are usually present in a transform while it is converted to a cis form upon irradiation of ultraviolet ray. Absorption spectrum of the cis form is shifted to the long wavelength side as compared with that of the trans form and therefore, the absorption spectrum is more different from that of the photolysis product so that the reading-out can be effected at a high sensitivity.

Other than measuring the absorption spectrum, the reading-out of information is possible by measuring photocurrent utilizing a phenomenon that photocurrent is sensitized with an azo compound. For such measurement of photocurrent, a photoconductive layer such as CdS, Se, amorphous Si, amorphous Se and the like and an electroconductive layer such as Cu, Al, Fe, Ni and the like are provided adjacent to the recording layer.

As the coupling agent, compounds having the following characteristics are preferable.

(1) Coupling speed is high at a particular pH range.

(2) Colorless, and the color does not change in an alkaline state or with the lapse of time.

(3) There is not any absorption disturbing the photolysis of diazonium salts.

(4) Easily soluble in water or an appropriate solvent.

Coupling agents having the above-mentioned characteristics are:
phenols, resorcinols, phloroglucins, naphthols, pyridones, pyrones and the like.

Examples of the coupling agents are sodium 2,3-dihydroxynaphthalene-6-sulfonate, 6-methylpyrone, 3-acetamidophenol, 4-bromoresorcinol, 2-hydroxynaphthalene-4-sulfonic acid and the like.

As shown above, information can be recorded at a level of molecular unit by using the record memory medium, and further, reading-out of record can be effected at a level of molecular unit according to the recording/reading-out method of the present invention. Therefore, recording/reading-out of high sensitivity and high density can be achieved as compared with the prior art.

The following examples are given for explaining the present invention more in detail.

EXAMPLE 1

A solution of 4-eicosylbenzenediazonium chloride zinc chloride double salt in chloroform ($10^{-3}$ mol/l) was spread on a water phase. While keeping the surface pressure constant, a glass substrate having a sufficiently clean and hydrophilic surface was slowly pulled up from and dipped into the water phase and a monomolecular film was transferred to the substrate. Thereby, the film of 35 Å thick was built-up to form a record memory medium having the monomolecular layer built-up film as a recording layer.

The resulting record memory medium was irradiated with white light according to a pattern and was developed with sodium 2,3-dihydroxy naphthalene-6-sulfonate for recording.

When the record was reproduced by irradiation of ultraviolet rays, it is possible to reproduce the record at a good ratio of S/N.

EXAMPLE 2

A solution of 2-eicosyl-4-N-benzyl-N-methylamino-5-p-chlorophenoxybenzenediazonium chloride zinc chloride double salt in chloroform ($10^{-2}$ mol/l) was used to form a monomolecular layer built-up film of 35 Å thick as a recording layer by the same manner as in Example 1. CdS layer of 40–50 μm thick was formed as a photoconductive layer on a reverse side of a substrate by coating using a copolymer of vinyl chloride and vinyl acetate as a binder. Next, Cu layer of 1000–2000 Å thick as an electroconductive layer was formed on the photoconductive layer by a vacuum vapor deposition method. Thus a record memory medium was formed.

The resulting record memory medium was irradiated with white light according to a pattern and was developed with solution B for recording.

When the record was reproduced by irradiation of laser and a measurement of a photoelectric current, it is possible to reproduce the record at a good ratio of S/N.

Solution B: Phloroglucinol 0.8 g, benzoic acid 0.25 g, sodium formate 16.0 g, thiourea 1.5 g were made 100 cc by adding water.

EXAMPLE 3

Using 2-ethoxy-5-decyloxy-4-p-tolylmercaptobenzenediazonium salt as a photosensitive organic compound, a record memory medium was formed by the same manner as in Example 1.

The resulting record memory medium was irradiated with white light according to a pattern and was developed with sodium 2,3-dihydroxy naphtahlene-6-sulfonate for recording.

When the record was reproduced by irradiation of ultraviolet rays, it is possible to reproduce the record at a good ratio of S/N.

EXAMPLE 4

A monomolecular layer of p-(1-n-octadecylmorpholino)-2,5-di-n-butoxybenzenediazonium salt as a photosensitive organic compound was formed on a substrate, followed by overlaying the resulting diazonium salt layer with a monomolecular layer of sodium naphthalene-6-sulfonate as coupling ingredient. Further, on the resulting layer, sodium sulfonate 4 g, thiourea 5 g, citric acid 4 g, ethylene glycol 5.0 cc, isopropyl alcohol 1.0 cc, zinc chloride 4,5 g and anhydrous magnesium chloride 1.5 g made 100 cc by adding water was applied in advance to form a record memory medium.

When the record memory medium was irradiated with white light according to a pattern, the recording was possible without using a developing liquid.

When the record was reproduced by irradiation of white light, it is possible to reproduce the record at a good ratio of S/N.

EXAMPLE 5

Using p-decylbenzenediazonium salt as a photosensitive organic compound, a record memory medium was formed by the same manner as in Example 1.

The resulting record memory medium was irradiated with white light according to a pattern and was developed with 3-acetamidophenol for recording.

When the record was reproduced by irradiation of ultraviolet rays, it is possible to reproduce the record at a good ratio of S/N.

What is claimed is:

1. A record memory medium comprising (a) a substrate and (b) a recording layer on said substrate which recording layer comprises a monomolecular film or monomolecular layer built-up film from about 4 to 10,000 angstroms in thickness of a photosensitive benzene diaxonium salt having a long-chain $C_8$ to $C_{30}$ alkyl group as a side chain, said $C_8$ to $C_{30}$ alkyl group being any one of saturated, unsaturated or substituted with an amino group or a carboxyl group, whereby said benzene diazonuim salt is capable of coupling with a coupling component to form an azo compound and whereby the medium, after photolysis and coupling reactions, is capable of being read out by light or photocurrent.

2. A record memory medium according to claim 1 wherein said monomolecular film or monomolecular layer built-up film is a Langmuir Blodgett film.

3. A record memory medium according to claim 1, wherein said substrate is selected from the group consisting of glass, aluminum, plastics, ceramics and silicon.

4. A record memory medium comprising (a) a substrate and (b) a recording layer on said substrate which recording layer comprises a monomolecular film or monomolecular layer built-up film from about 4 to 10,000 angstrom in thickness of a photosensitive benzene diazonium salt having a long-chain $C_8$ to $C_{30}$ alkyl group as a side chain, said $C_8$ to $C_{30}$ alkyl group being any one of saturated, unsaturated or substituted witn an amino group or a carboxyl group, and (c) photoconductive layer, whereby said benzene diazonium salt is capable of coupling with a coupling component to form an azo compound and whereby the medium, after photolysis and coupling reactions, is capable of being read out by light or photocurrent.

5. A record memory medium according to claim 4, wherein said monomolecular film or monomolecular layer built-up film is a Langmuir-Blodgett film.

6. A record memory medium according to claim 4, wherein said substrate is selected from the group consisting of glass, aluminum, plastics, ceramics and silicon.

7. A recording memory medium according to claim 4, wherein said photoconductive layer is made from the group consisting of CdS, Se, amorphous Si, and amorphous Se.

8. A record memory medium comprising (a) a substrate and (b) a recording layer on said substrate which recording layer comprises a monomolecular film or monomolecular layer built-up film from about 4 to 10,000 angstroms in thickness of (1) a photosensitive benzene diazonium salt having a long-chain $C_8$ to $C_{30}$ alkyl group as a side chain, said $C_8$ to $C_{30}$ alkyl group being, any one of saturated, unsaturated or substituted with an amino group or a carboxyl group, and (2) a coupling component whereby said benzene diazonium salt is capable of coupling with a coupling component to form an azo compound and whereby the medium, after photolysis and coupling reactions, is capable of being read out by light or photocurrent.

9. A record memory medium according to claim 8, wherein said monomolecular film or monomolecular built-up film is a Langmuir-Blodgett film.

10. A record memory medium according to claim 8, wherein said substrate is selected from the group consisting of glass, aluminum, plastics, ceramics and silicon.

11. A record memory medium comprising (a) a substrate (b) a recording layer on said substrate which recording layer comprises a monomolecular film or monomolecular layer built-up film from about 4 to 10,000 angstroms in thickness of (1) a photosensitive benzene diazonium salt having a long-chain $C_8$ to $C_{30}$ alkyl group as a side chain, said $C_8$ to $C_{30}$ alkyl group being any one of saturated, unsaturated or substituted with an amino group or a carboxyl group, and (2) a coupling component and (c) photoconductive layer whereby said benzene diazonium salt is capable of coupling with a coupling component to form an azo compound and whereby the medium, after photolysis and coupling reactions, is capable of being read out by light or photocurrent.

12. A record memory medium according to claim 11, wherein said monomolecular film or monomolecular built-up film is a Langmuir-Blodgett film.

13. A record memory medium according to claim 11, wherein said substrate is selected from the group consisting of glass, aluminum, plastics, ceramics and silicon.

14. A recording memory medium according to claim 11, wherein said photoconductive layer is made from the group consisting of CdS, Se, amorphous Si, and amorphous Se.

* * * * *

UNITED STATES PATENT AND TRADEMARK OFFICE
CERTIFICATE OF CORRECTION

PATENT NO. : 4,618,561

DATED : October 21, 1986

INVENTOR(S) : HIROHIDE MUNAKATA, ET AL.

It is certified that error appears in the above-identified patent and that said Letters Patent is hereby corrected as shown below:

COLUMN 7

Line 31, "diaxonium" should read --diazonium--;
Line 51, "angstrom" should read -- angstroms--; and
Line 54, "witn" should read --with--.

COLUMN 8

Line 20, "being, anyone of" should read --being anyone of--; and
Line 34, "(b) a" should read --and (b) a--.

Signed and Sealed this

Fourteenth Day of April, 1987

Attest:

DONALD J. QUIGG

Attesting Officer

Commissioner of Patents and Trademarks